April 3, 1945.     C. E. BREWSTER     2,373,083
FASTENING DEVICE
Filed Oct. 29, 1943

Charles E. Brewster INVENTOR.
BY James M. Clark
His Patent Attorney

Patented Apr. 3, 1945

2,373,083

UNITED STATES PATENT OFFICE 2,373,083

FASTENING DEVICE

Charles E. Brewster, Seattle, Wash., assignor to Boeing Aircraft Company, a corporation of Washington Application October 29, 1943, Serial No. 508,212

3 Claims. (Cl. 85—5)

The present invention relates to fastening devices and more particularly to a quickly releasable locking pin.

It is frequently necessary in temporarily attaching two plates or similar elements to accomplish this attachment from one side of the assembly only. This has been generally referred to in the art as a "blind" attachment or fastening and my improved device relates to such "blind" devices which are provided with a locking means in order to prevent their slipping out or their unintentional removal from the elements which are temporarily held together or fastened by the fastening device.

In the manufacture and operation of aircraft numerous assemblies are required to be made in which the work is accessible conveniently from a single side only and it is to such applications that my quickly releasable locking device is more particularly adapted. The use of the present locking pin has been found extremely efficient and satisfactory in connection with the removable and interchangeable bomb rack sections of military aircraft. My improved device comprises essentially a tubular pin having a head portion and a detent means on its shank end which is automatically moved into its locking position through the camming action of an axially disposed rod extending thru the tubular bore of the pin and projecting beyond its head portion.

It is accordingly a major object of the present invention to provide a simple and efficient locking or coupling pin which is adapted to be inserted or readily released from one side of an assembly only. It is a further object to provide such a quickly releasable locking pin which consists of a minimum number of movable elements such that it is quickly and economically manufactured and requires no special tools for its insertion, operation or removal.

It is a further object of the present invention to provide a quickly releasable locking pin which is particularly adapted for the rapid and efficient temporary attachment of readily interchanged or relocated bomb rack sections of aircraft. It is a further object to provide such a device in which the detent or locking means becomes automatically effective upon release of the unlocking force.

A still further object of this invention resides in the provision of a simple and efficient modification of the aforementioned quick release locking pin which is adapted for the temporary alinement and securement of two superimposed sheets which it may be desired to temporarily hold while they are being riveted or otherwise fastened together. Other objects and advantages of the present invention will become apparent to those skilled in the art after a reading of the present description and the accompanying drawing in which.

Figure 1:
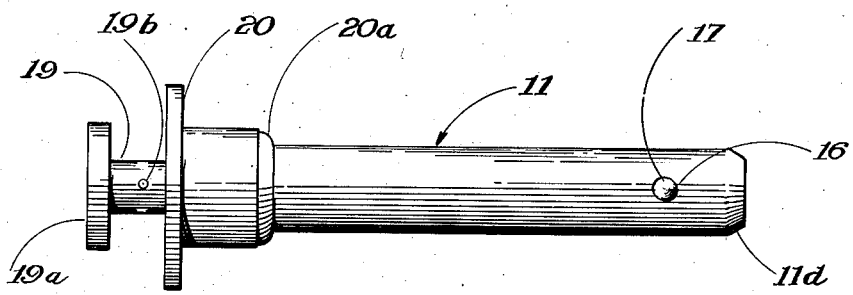
Fig. 1 shows a plan view of my improved quickly releasable fastening pin.
Figure 2:
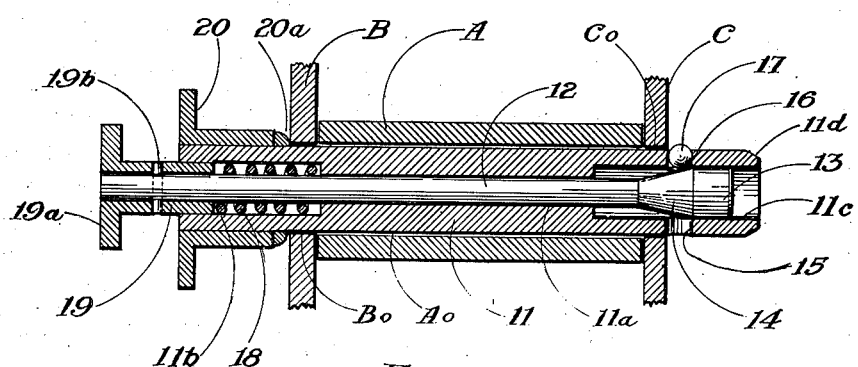
Fig. 2 shows a cross sectional elevation of the pin shown in Fig. 1 as applied to attach adjacent bomb rack sections.

Referring now to Figs. 1 and 2, there is shown a form of my quickly releasable locking pin having a relatively extended shank length adapted to temporarily fasten the spaced plates B and C of adjacent bomb racks between which is interposed the tubular sleeve A. In this modification the locking pin 11 may preferably form a part of the aircraft type bomb rack which is made in sections represented by the portions B and C and spaced as determined by the sleeve A. In currently used military aircraft certain of these bomb rack sections can be removed or the location of the sections within the airplane can be changed. On the other hand, the bomb rack may have been previously installed to accommodate one type or size of bomb and it may be desired to have it replaced by the bomb rack adapted to accommodate a different type or size of bomb. The present locking pins have been found particularly efficient and serviceable in their employment for the quick interchange or relocation of these bomb rack sections and the desired bomb rack rearrangements have been accomplished, particularly in the field under unfavorable conditions, both quickly and satisfactorily and without the use of wrenches or other special tools.

The form of the locking pin, as shown in Figs. 1 and 2, includes a tubular pin element or shank 11 having an axial bore 11a and enlarged bores 11b and 11c at its ends. A rod element 12 is centrally and co-axially disposed such that it slides readily within the bore 11a, having at one end an enlarged cylindrical portion 13 which is readily slidable within the bore 11c of the pin element and an adjacent frusto-conical portion 14 adjacent the enlarged cylindrical end 13. The conical or tapered portion 14 serves as a camming means for a ball detent 17 which is retained in the projected position shown in Fig. 2 by a restricted outer portion of the radially disposed hole 16. A similar and oppositely disposed hole 15 of slightly larger diameter than the ball 17 is provided within the counterbored portion of the pin 11 to facilitate the assembly of the ball detent within the locking pin. The restriction at 16 may preferably be formed by not drilling quite through the pin.

Within the counterbored portion 11b at the opposite end of the shank of the tubular pin 11 there is provided a compression spring 18 in an encircling arrangement concentrically disposed about the rod 12, the adjacent end of which is provided with a handle or rod head fitting 19. This handle portion is provided with a flanged end 19a preferably disposed in flush relationship with the end of the rod 12 to which it is fixedly attached by the transversely disposed retaining pin 19b. The outside diameter of the hub portion of the handle fitting 19 is such that it is freely slidable within the bore 11b of the tubular pin body against the opposition of the compression spring 18 which in turn bears against the shouldered portion where the smaller bore 11a starts. The adjacent end of the pin body 11 is also provided with a flanged head fitting 20 having its hub portion closely fitted about the outside diameter of the pin 11 to which it is welded or brazed as at 20a, or otherwise fixedly attached to the tubular pin. The fitting 20, in an alternative form, might be provided with radially extending arms or wings instead of the annular flange shown. And it could, of course, be made integral or of the same piece of stock as the tubular pin portion 11 with a shoulder turned or formed for abutment against the plate B. The opposite end of the pin shank beyond the detent 17 is suitably beveled or chamfered as at 11d to permit it to be inserted readily within the openings or bores Ao, Bo and Co of the bomb rack assembly.

The form of fastening pin shown in Fig. 2 is preferably assembled by first inserting the detent ball 17, through the opening 15 and into the restricted opening 16; inserting the rod 12 without its handle 19 through the chamfered end of the tubular pin until it projects through the opposite end of the pin and its camming portion 14 maintains the ball within its opening 16; placing the spring 18 about the opposite end of the rod 12 and sliding the same into the counterbored portion 11b after which the handle fitting 19 is passed over the adjacent end of the rod and the pin 19b inserted therethrough.

To insert the locking pin 11 through the openings Ao, Bo and Co it is merely necessary to depress the head 19, preferably by the thumb, against the handle 20 held by the fingers, thereby compressing the spring 18 and permitting the conic portion 14 to move toward the end of the pin shank and permit the ball 17 to be moved from beyond the outer surface of the pin. The inward movement of the ball detent 17 permits the remainder of the shank 11 to be inserted through the alined openings Ao, Bo and Co until the shoulder formed by the weld 20a or other hub portion is disposed against, or adjacent, the plate B. The spring 18 causes outward movement of the handle and its separation from the pin head 20, upon release of pressure against the handle 19, and the resulting camming effect of the tapered portion 14 causes the ball 17 to be moved to its extreme outward position against the restriction 16 of the hole. In this position it projects appreciably beyond the outer cylindrical surface of the pin 11 and locks the latter against withdrawal by bearing against the edge of the opening Co in the plate C. The diameter of the ball 17 is preferably greater than the depth of the space between the surface of the rod 12 and the bore 11c such that the ball does not leave the region of its hole when the rod 12 is telescoped within the tubular pin 11 to the point where the ball rests upon the outer surface of the rod 12.

It will accordingly be seen that the quick release locking pin of Figs. 1 and 2 is capable of use wherever a bolt and nut might be used conventionally, as well as in "blind" locations where the nut would not be accessible, thus prohibiting the use of the bolt and nut. The tapered portion 14 of the pin continues to engage the ball 17 to force the same against the restriction 16 such that the ball maintains contact with the structure C, through which the shank had been inserted, to prevent removal of the locking pin until the rod element 12 is again depressed and moved toward the right. It has been found that one ball 17 is sufficient to effect a secure locking action, although several balls may preferably be used where the type of installation makes it desirable.

Figure 3:
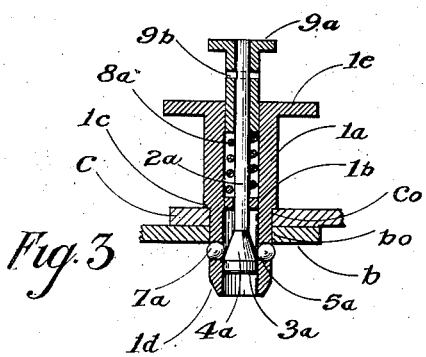
Fig. 3 shows a modification of my fastening device adapted for the temporary fastening of two sheets or plates.

In Fig. 3 there is shown a modification of my fastening device applied as a temporary fastener for adjacent sheets b and c provided with alined openings bo and co. This fastener is substantially identical in structure and operation as that of Figs. 1 and 2 with the exception that it is normally much smaller in size, has fewer parts and is generally of simpler construction. The tubular body 1a is bored or drilled from each end such that a transverse partition or abutment 1b is provided and which in turn is provided with a bore of a suitable diameter to receive the rod 2a. The abutment 1b serves as a stop or partition against which the compression spring 8a is adapted to bear and also as a guide or bearing for the rod 2a. In this modification the body portion 1a is preferably of a single integral piece of stock having its shank comprised of portions of two different diameters with an intermediate shoulder at 1c, a chamfered shank end at 1d, and a flanged or winged end at 1e. The rod 2a is provided with an enlarged end portion 3a, a tapered or conical portion 4a and a handle portion 9a fixed to the rod by means of the pin 9b.

The rod assembly in this modification is identical, except for the size, with that shown in Fig. 2. A compression spring 8a is interposed between the hub of the handle 9a and the abutment 1b such that when the pressure on the handle 9a is released and the body 1a has its shouldered portion bearing upon the top plate c, the camming effect of the tapered portion 4a causes the ball 7a to be forced outwardly against the restrictions of the holes 5a. The outer ends of the ball receiving holes 5a are preferably peened over such that the balls are prevented from falling out and in their outer positions extend substantially beyond the outside diameter of the shank portion of the pin body such that it cannot readily be removed until the handle portion 9a is again depressed against the spring 8a, by having the two handle portions brought together, either manually by the thumb and fingers, or by a suitable plier type tool.

It is considered that in the above description and the accompanying drawing there has been disclosed a readily releasable fastening device which is relatively simple of manufacture and operation, and which obtains each of the objects and advantages as set forth above. While I have shown but two modifications of this device for explanatory purposes only and not by way of limitation, other forms and modifications both with respect to general arrangement and details of the several parts, which may become obvious to those skilled in the art are intended to come within the scope and spirit of my invention as more definitely set forth in the appended claims.

I claim:

1. A quick release locking pin for retaining the apertured elements of a bomb rack assembly which are accessible from one side only, comprising a tubular pin engageable with said apertures by insertion from said accessible side, the said tubular pin having an enlarged head portion at one terminal and provided with a centrally bored portion and counterbored end portions, the said counterbore in said pin remotely disposed from said head portion provided with a radially disposed aperture, a ball detent disposed for radial movement within said radial aperture, a detent actuating means comprising a rod axially disposed within said tubular pin, said rod being of a diameter which closely fits within and is slidably guided by the centrally bored portion of said tubular pin, said actuating rod having an enlarged portion of both cylindrical and conical shape closely fitting for guided sliding within the counterbore of said tubular pin remote from its head portion, the said actuating rod having an enlarged head portion closely fitting for guided sliding within the counterbored head portion of said tubular pin, a compression spring interposed between said centrally bored portion of said pin and the head portion of said rod closely fitting about the outside of said rod and within the counterbored head portion of said pin whereby drawing of the pin and rod head portions together in a radial direction causes compacting of said spring and release of said conic portion from said ball detent.

2. In aircraft, a device for temporarily securing apertured members of a bomb rack of the type comprising a tubular pin having a head formed at one of its ends and a ball detent movably retained within its opposite end, the said tubular pin having a central portion bored to a reduced diameter and enlarged counterbored end portions, an elongated rod element axially movable within the centrally bored portion in a closely sliding relationship therewith, said rod element having a conic camming surface carried thereby for unlocking movement of said ball detent upon axial movements of said pin and elongated member toward each other, said rod element having enlarged cylindrical portions at each of its ends for closely guided sliding within the enlarged counterbored portions of said tubular pin, a compression coil spring co-axially disposed between the enlarged head portion of said rod element and the reduced diameter centrally bored portion of said tubular pin adapted to resiliently oppose axial movement of said pin and rod head portions toward each other, the said enlarged head portion of said rod element closely fitting for guided sliding within the enlarged counterbored head portion of said tubular pin whereby in axial sliding movements for release or actuation of said ball detent the said pin element is slidably guided within said tubular pin at both said counterbored portions and said centrally bored intermediate portion.

3. A device for temporarily securing the adjacent apertured plates and intermediate sleeve of a bomb rack assembly of the type comprising a tubular pin having a head portion engageable against one of said bomb rack plates, said pin having the end portion of its shank axially counterbored and diametrically apertured, a ball detent carried within said shank aperture, said pin having its head portion axially counterbored, a rod element axially movable with respect to said tubular pin having a tapered enlargement at one end axially slidable in closely guided relationship within said counterbored shank portion, said rod element having an enlarged head portion extending beyond and closely slidable within the said counterbored head portion of said tubular pin, the said rod element having its intermediate portion of a diameter which is closely slidable for guided movement within the centrally bored portion of said tubular pin, resilient means disposed between said rod element head portion and the said central portion of said tubular pin tending to urge said head portions into their extended relationship in which the tapered portion at the outer end of said rod element engages said ball detent for outward radial movement into its extended position in which it prevents removal of said tubular pin by contact with the second of said bomb rack plates.

CHARLES E. BREWSTER.